United States Patent
Mainini et al.

(10) Patent No.: US 7,503,285 B2
(45) Date of Patent: Mar. 17, 2009

(54) FLEXIBLE ANIMAL TRAINING ELECTRODE ASSEMBLY

(75) Inventors: Christopher E. Mainini, Knoxville, TN (US); Walter D. Scott, Austin, TX (US)

(73) Assignee: Radio Systems Corporation, Knoxville, TN (US)

( * ) Notice: Subject to any disclaimer, the term of this patent is extended or adjusted under 35 U.S.C. 154(b) by 227 days.

(21) Appl. No.: 11/157,251

(22) Filed: Jun. 21, 2005

(65) Prior Publication Data

US 2006/0283401 A1   Dec. 21, 2006

(51) Int. Cl.
*A01K 15/02* (2006.01)

(52) U.S. Cl. ........................... 119/719; 119/720

(58) Field of Classification Search ........... 119/712, 119/718, 719, 720, 856, 859; 607/58
See application file for complete search history.

(56) References Cited

U.S. PATENT DOCUMENTS

| | | | | |
|---|---|---|---|---|
| 5,193,484 A | * | 3/1993 | Gonda | 119/859 |
| 5,207,178 A | * | 5/1993 | McDade et al. | 119/859 |
| 5,934,225 A | * | 8/1999 | Williams | 119/859 |
| 6,830,012 B1 | | 12/2004 | Swan | |
| 6,907,844 B1 | * | 6/2005 | Crist et al. | 119/718 |

* cited by examiner

*Primary Examiner*—T. Nguyen
(74) *Attorney, Agent, or Firm*—Pitts, Brittian, P.C.

(57) ABSTRACT

A flexible electrode assembly for use with an electronic animal training device. The flexible electrode assembly provides pressure relief in the event that the collar is over-tightened. Pressure relief is obtained through the use of resilient materials or mechanical pre-loads that allow movement in response to applied pressure. Because the position of the electrodes in the flexible electrode assembly is not fixed, pet owners are generally more likely to properly tighten the collar thereby allowing the animal training device to function effectively.

1 Claim, 10 Drawing Sheets

FLEXIBLE ANIMAL TRAINING ELECTRODE ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The invention relates to animal training devices. More specifically, this invention relates to electrodes for use with an electronic animal training device.

2. Description of the Related Art

Electric animal training devices are commonly used today in a variety of applications. They are used to deter undesirable behavior in unattended animals, provide positive and negative reinforcement for animals during interactive training sessions, to encourage pets to remain within specified areas, and to deter pets from entering certain areas. Examples of these devices include electronic bark collars, remote training transmitters and associated collars, and containment systems having a transmitter connected to a boundary wire and an associated collar unit.

A commonly used correction stimulus in electronic animal training devices is an electric shock stimulus. The collar unit, which is worn by the pet, houses an electric shock generating circuit that administers a shock stimulus to the animal through two external electrodes. The standard electrode used in most electric animal training devices available today is formed from an electrically conductive material, typically a metal. An electrode has a rounded hex-head shape with a threaded extension. The threaded extension physically and electrically connects the electrode to the collar unit. An example of a conventional animal training electrode is illustrated in FIG. 1.

Being formed from an electrically conductive metal, the animal training electrodes in use today are rigid and inflexible. While considerable effort has been put into educating pet owners on how to properly fit an electronic animal training device to their pet, problems in this area still exist. First, a pet owner maybe reluctant to properly tighten the collar around the pet's neck for fear that the rigid metal electrodes will injure the pet. If the collar is not properly tightened, the electrodes do not make good electrically contact with the skin of the pet thereby preventing the electronic animal training device from delivering a productive deterrent stimulus. Alternatively, pet owners attempting to ensure that the collar is securely attached and that good electrical contact is made are likely to over-tighten the collar. With the collar fastened too tightly, the electrodes press into the neck of the animal and may lead to a condition known as pressure necrosis. Pressure necrosis produces lesions on the pet's neck that are prone to infection. Ultimately, it is not desirable for the collar to be too tight or too loose because the animal training device does not work effectively or results in unnecessary injury to the pet.

BRIEF SUMMARY OF THE INVENTION

A flexible electrode assembly for use with an electronic animal training device is shown and described. The flexible electrode assembly provides pressure relief in the event that the collar is over-tightened. Pressure relief is obtained through the use of resilient materials or mechanical pre-loads that move in response to applied pressure. Because the position of the electrodes in the flexible electrode assembly is not fixed, pet owners are generally more likely to properly tighten the collar thereby allowing the animal training device to function effectively.

The embodiments of the electrode assembly included herein illustrate various features common to electrode assemblies that fall within the scope of this invention. All of the electrode assemblies embodying the present invention exhibit a degree of flexibility that allows the electrode tips to be displaced by the application of a force. The electrode assemblies are generally categorized into two main types. First are the soft electrode assemblies. The flexibility and resilience of the soft electrode assembly primarily results from the selection of materials used to fabricate the soft electrode assembly. The materials used to fabricate the soft electrode assemblies are typically soft elastomeric non-conductive materials that are easily deformable and resilient enough to return to the original shape despite repeated stresses. The flexible zone for the soft electrode assemblies generally encompasses the entire electrode assembly with the more relevant flexible zone being that defined by the projections supporting the electrodes. A second type of electrode assembly is the mechanical pre-load electrode assemblies. The mechanical pre-load electrode assemblies are generally fabricated from more rigid materials that provide greater durability. Rather than rely on the flexibility of the material, the ability of movement is imparted through the use of mechanical design principles that allow the substantially rigid members to flex about certain points. The mechanical pre-loads generally act as spring forces that hold the electrode tips at a default resting position but allow the electrode tips to move when a force is applied and control the amount of force necessary to displace the electrode tips. The flexible zone of the mechanical pre-load electrode assemblies is generally limited to specific areas where flexibility has been designed, such as the area proximate to the point where rigid projections are connected to the base or a bend in the rigid projections.

For soft electrode assemblies primarily fabricated from resilient materials the following features are common. The soft electrode assembly is formed out of a flexible and resilient material that carries the electrical conductor used to transmit the electric stimulus to the animal. A first projection and a second projection extend outwardly from a base to form a pair of probes. Each projection is located proximate to one end of the base. At the tip of each projection, an electrically conductive material forms an electrode tip that transfers the corrective stimulus to the animal. Each of a pair of connector openings, in the base are through-openings adapted to receive a fastener that secures the soft electrode assembly to the collar unit. An electrically-conductive and rigid grommet, bounding each of the connector openings, adds physical strength to the flexible material forming the soft electrode assembly. The grommets also provide an electrical connection point between the probe outputs on the collar unit and the projections of the soft electrode assembly.

A pair of optional relief openings exposes portions of flexible electrical conductors that connect each of the grommets to the corresponding electrode tip. The relief openings reduce the amount of material that must be deformed when the soft electrode assembly is flexed. The reduced amount of material reduces the amount of force necessary to reposition the projections. Further the relief openings provide access to the conductors for purposes such as continuity testing.

In response to an applied force, the electrode tips are displaceable from the normal resting position. One source for the applied force is pressure resulting from the animal pressing the collar unit against another object, such as when the animal lies down. Another source is the tightening of collar. Because of the flexibility of the materials used in the projections, and the electrical conductor, the projection is able to move in response to the force without breaking. The projection is sufficiently flexible to move in response to the applied force to reduce the pressure applied to the throat of the animal by the soft electrode assembly. Repositioning the projections, of the soft electrode assembly in response to an applied force alleviates pain, discomfort, and potential injury to the animal, including conditions such as pressure necrosis. For the resilient embodiments of the soft electrode assembly, the entirety of each projection generally defines a flexible zone.

A mechanical pre-load electrode assembly is fabricated from more rigid materials than the soft electrode assembly. A first projection and a second projection are located proximate to opposing ends of the base and extend outwardly from a substantially rigid base to form a pair of probes. The first projection and the second projection are substantially rigid members that are attached to the base at a first end, and move freely at a distal second end. An electrode tip is carried proximate to the second end of each of the first projection and the second projection. The electrode tips are fabricated from an electrically conductive material and serve to transfer the corrective stimulus to the animal.

Mechanical configurations such as the connection between the base and each first end or a bend in the projection results in a flexible joint that allows the second end to move towards and away from the base. As with the soft electrode assemblies, the mechanical pre-load electrode assemblies also includes a pair of connector openings, adapted to receive a fastener that secures the mechanical pre-load electrode assembly to the collar unit. Grommets bounding each of the connector openings provide electrical and physical connection points. Optional openings exposing the connector primarily serve to allow access to the internal electrical conductor connecting the grommets to the electrode tips for testing purposes.

Because of the flexibility of the materials used in the projections the support members, and the electrical conductors, the projections are able to move in response to the force without breaking and, thereby, reduce the pressure applied to the throat of the animal by the mechanical pre-load electrode assembly. Repositioning the projections of the mechanical pre-load electrode assembly in response to an applied force alleviates pain, discomfort, and potential injury to the animal, including conditions such as pressure necrosis.

Proper fit and placement of an electronic animal training apparatus is necessary for achieving the effective operation. A typical mechanism for securing an electronic animal training apparatus to a pet is with a collar, although other mechanisms are considered to be with the scope and spirit of the present invention. With conventional rigid electrodes a typical set of fitting instructions notify the consumer that the electrodes must be placed in direct contact to the animal's skin on the underside of the animal's neck with the animal in a standing position. Further, it is suggested that sometimes it is necessary to trim the fur in the area where the electrodes engage the animal's skin to ensure consistent contact. The tightness of the collar when using rigid electrodes is tested by inserting one finger between the end of the electrode and the animal's neck. The fit should be snug but not constricting.

The general instructions for fitting an electronic animal training apparatus to an animal are subjective and depend upon variables such as the thickness of the consumer's fingers and the consumer's definitions of "snug" and "not constricting." As previously discussed, the interpretation of "snug but not constricting" is modified by the consumer's concerns over effective operation and potential pain, discomfort, and injury. The animal training electrode assembly of the present invention, as illustrated and described through various embodiments, reduces the effects of the subjective variables and allows the associated electronic animal training apparatus to operate more effectively regardless of the consumer's predispositions affecting collar tightness.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A flexible electrode assembly for use with an electronic animal training device is shown and described in the figures. The flexible electrode assembly provides pressure relief in the event that the collar is over-tightened. Pressure relief is obtained through the use of resilient materials or mechanical pre-loads that move in response to applied pressure. Because the position of the electrodes in the flexible electrode assembly is not fixed, pet owners are generally more likely to properly tighten the collar allowing the animal training device to function effectively.

All of the flexible electrode assemblies embodying the present invention exhibit a degree of flexibility that allows the electrode tips to be displaced by the application of a force. The electrode assemblies are generally categorized into two main types. First are the soft electrode assemblies. The flexibility and resilience of the soft electrode assembly primarily results from the selection of materials used to fabricate the soft electrode assembly. The materials used to fabricate the soft electrode assemblies are typically soft, elastomeric, non-conductive materials that are easily deformable and resilient enough to return to the original shape despite repeated stresses. The flexible zone for the soft electrode assemblies generally encompasses the entire electrode assembly with the more relevant flexible zone being that defined by the projections supporting the electrodes. A second type of electrode assembly is the mechanical pre-load electrode assemblies. The mechanical pre-load electrode assemblies are generally fabricated from more rigid materials that provide greater durability. Rather than rely on the flexibility of the material, the ability of movement is imparted through the use of mechanical design principles that allow the substantially rigid members to flex about certain points. The mechanical pre-loads generally act as spring forces that hold the electrode tips at a default resting position but allow the electrode tips to move when a force is applied and control the amount of force necessary to displace the electrode tips. The flexible zone of the mechanical pre-load electrode assemblies is generally limited to specific areas where flexibility has been designed, such as the area proximate to the point where rigid projections are connected to the base or a bend in the rigid projections.

Figure 1:
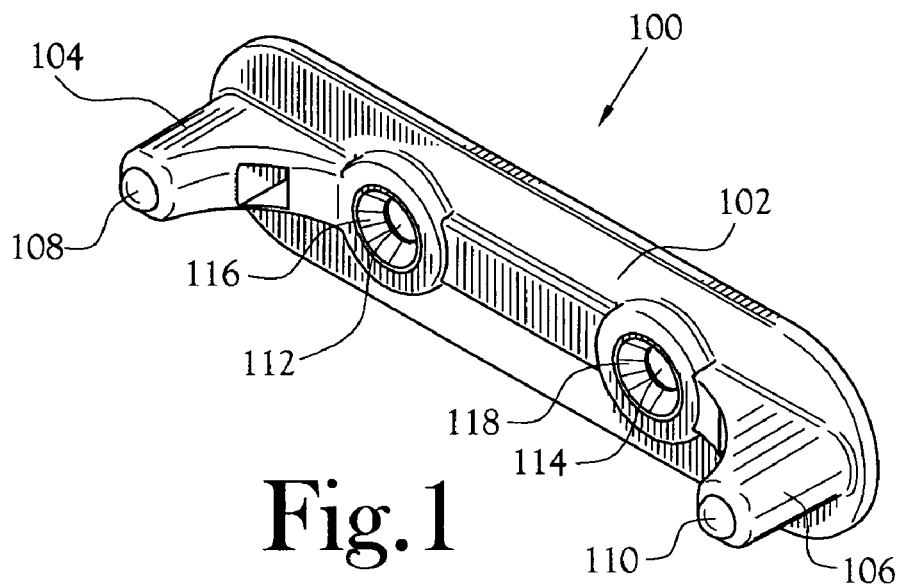
FIG. 1 is a perspective view of one embodiment of an electrode assembly.

FIG. 1 shows a perspective view of one embodiment of a horizontal soft electrode assembly 100 according to the present invention. The horizontal soft electrode assembly 100 is formed out of a flexible material that carries the electrical conductor used to transmit the electric stimulus to the animal. In the illustrated embodiment, the carrier includes a base 102 that is a substantially planar member. A first projection 104 and a second projection 106 extend outwardly from the base 102 to form a pair of probes. Each projection 102, 104 is located proximate to one end of the base 102. At the tip of each projection 102, 104, an electrically conductive material forms an electrode tip 108, 110 that transfers the corrective stimulus to the animal. Each of a pair of connector openings 112, 114 in the base 102 are through-openings adapted to receive a fastener that secures the horizontal soft electrode assembly 100 to the collar unit. An electrically-conductive and rigid grommet 116, 118 bounding each of the connector openings 112, 114 adds physical strength to the flexible material forming the horizontal soft electrode assembly 100. Further, the grommets 116, 118 provide an electrical connection point between the probe outputs on the collar unit and the projections 102, 104 built into the horizontal soft electrode assembly 100.

Figure 2:
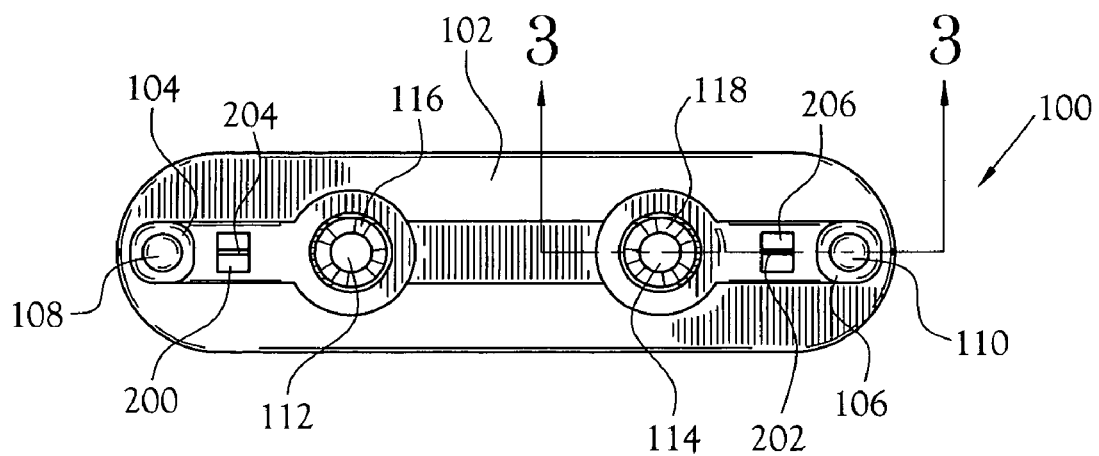
FIG. 2 is a front elevation view of the electrode assembly of FIG. 1.
Figure 3:
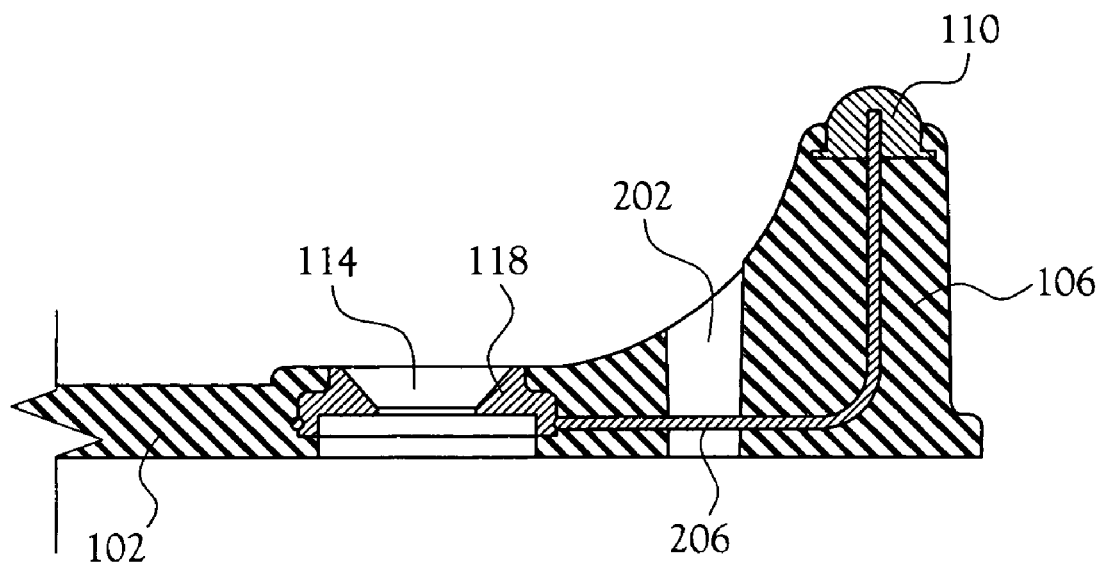
FIG. 3 is a sectional view of the electrode assembly of FIG. 1 taken along section lines 3-3.

FIG. 2 is a front elevation view of the horizontal soft electrode assembly 100 of FIG. 1. In this view, a pair of optional relief openings 200, 202 is visible. Exposed by the relief openings 200, 202 are portions of the electrical conductors 204, 206 connecting each of the grommets 116, 118 to the corresponding electrode tip 108, 110. The relief openings 200, 202 reduce the amount of material that must be deformed when the electrode assembly 100 is flexed. The reduced amount of material reduces the amount of force necessary to reposition the projections 104, 106. FIG. 3 is a sectional view of FIG. 2 taken along lines 3-3 providing a view of the internal structure of an end portion of the horizontal soft electrode assembly 100. In one embodiment, the electrical conductor 206 is a flexible and resilient wire such as piano wire.

Figure 4:
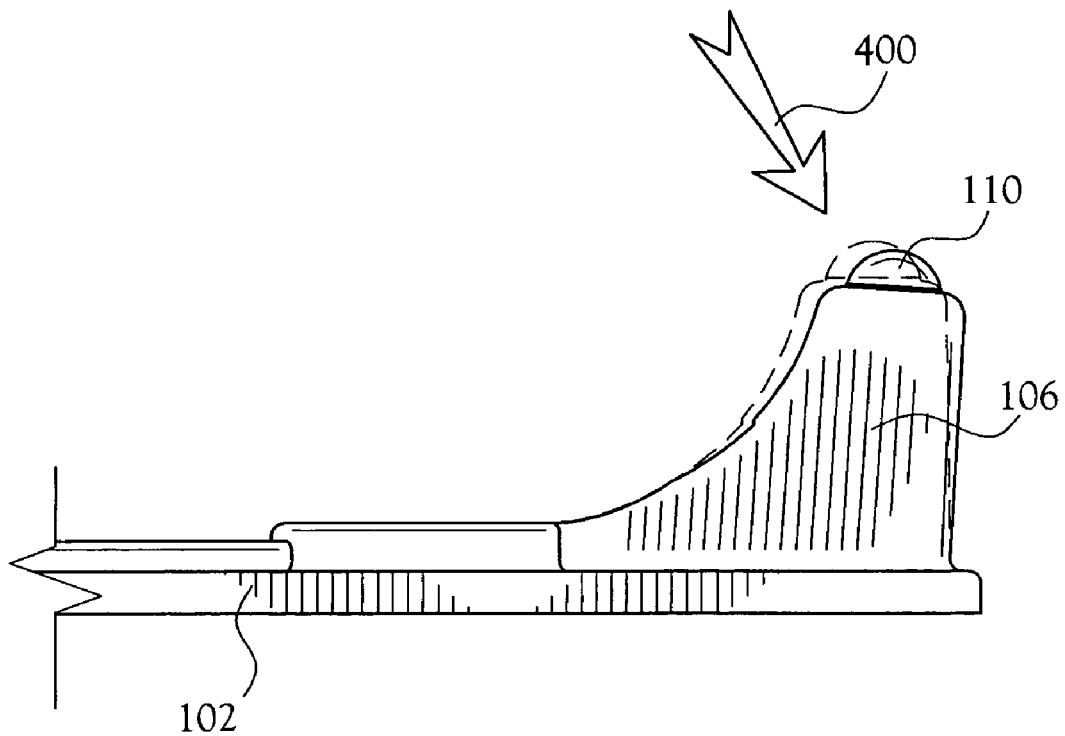
FIG. 4 illustrates one end of the electrode assembly showing the movement of the probe member in response to an applied force resulting from over-tightening of the collar.

FIG. 4 illustrates the effects of a force 400 applied to a projection 106 of the horizontal soft electrode assembly 100. One source for the applied force is pressure resulting from the animal pressing the collar unit against another object, such as when the animal lies down. Another source is the tightening of collar. FIG. 4 shows the resting position of the projection 106 in phantom relative to the new position of the projection 106 due to the applied force 400. Because of the flexibility of the materials used in the projections 104, 106 and the electrical conductors 204, 206, the projections 104, 106 are able to move in response to the force 400 without breaking. The projections 104, 106 are sufficiently flexible to move in response to the applied force 400 to reduce the pressure applied to the throat of the animal by the horizontal soft electrode assembly 100. Repositioning the projections 104, 106 of the horizontal soft electrode assembly 100 in response to an applied force alleviates pain, discomfort, and potential injury to the animal, including conditions such as pressure necrosis. For the illustrated embodiment of the horizontal soft electrode assembly 100, the entirety of each projection 104, 106 generally defines a flexible zone.

Figure 5:
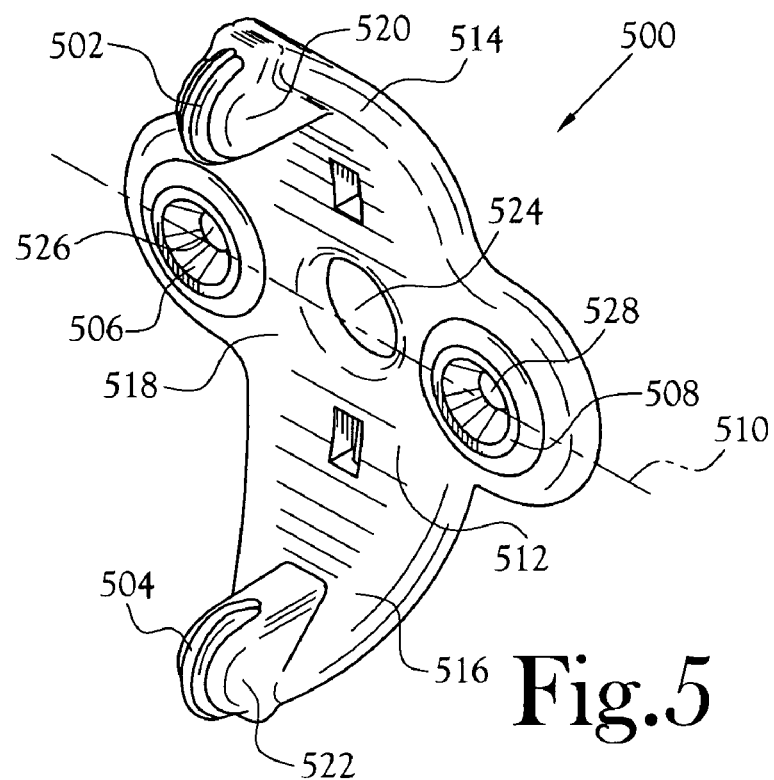
FIG. 5 is a perspective view of another embodiment of the electrode assembly.

FIG. 5 illustrates a perspective view of another embodiment of a vertical soft electrode assembly 500. In the illustrated embodiment, the electrode tips 502, 504 are displaced orthogonally to the line 510 running through the centers of the grommets 506, 508. A pair of wings 514, 516 extends from the main body 518 of the base 512. In the illustrated embodiment, the wings 514, 516 have a tapered and curved shape. A projection 520, 522 lies proximate to the end of each wing 514, 516 and projects from the concave side of each wing 514, 516. The electrode tips 502, 504 are carried by the projections 520, 522. In the illustrated embodiment, the vertical soft electrode assembly 500 includes a probe opening 524 to accommodate collar units such as anti-bark collars that include a probe resting against the neck of the animal to detect vibrations. The grommets 506, 508 bound a pair of connector openings 526, 528 to provide strength and electrical contact points.

Figure 6:
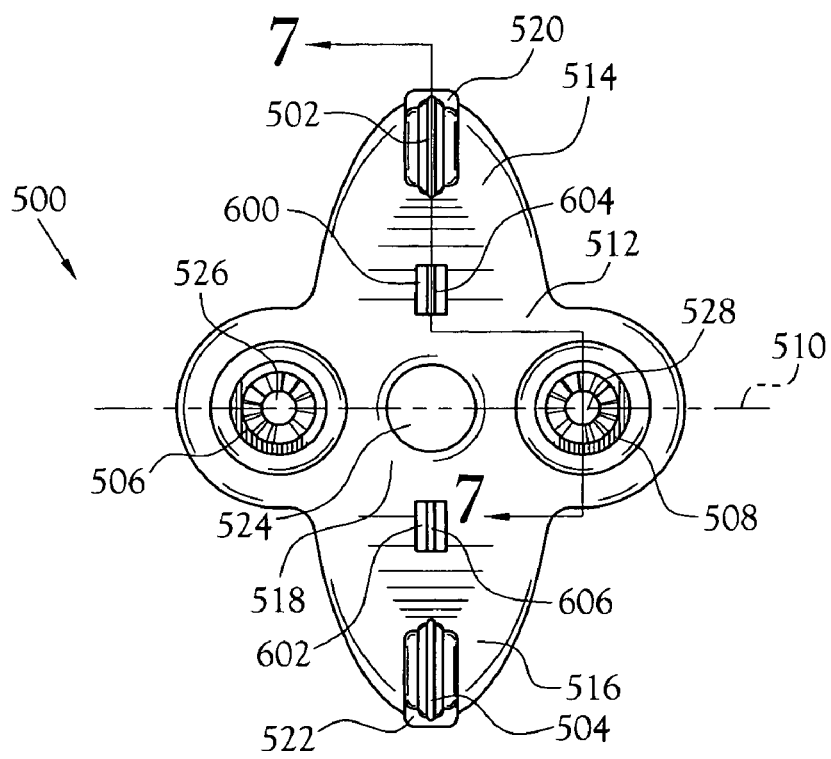
FIG. 6 is a front elevation view of the electrode assembly of FIG. 5.
Figure 7:
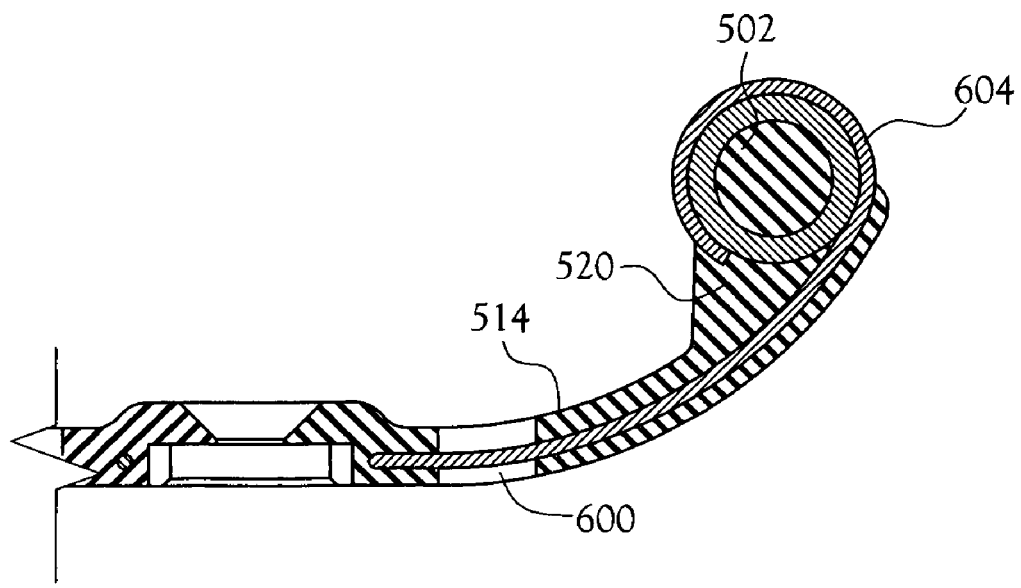
FIG. 7 is a sectional view of the electrode assembly of FIG. 5 taken along section lines 8-8.

FIG. 6 illustrates a front elevation view of the electrode assembly 500. A pair of optional relief openings 600, 602 exposes portions of the electrical conductors 604, 606 connecting each of the grommets 506, 508 to the corresponding electrode tip 502, 504. FIG. 7 is a sectional view of FIG. 6 taken along lines 7-7 providing a view of the internal structure of an end portion of the electrode assembly 100. In the illustrated embodiment, the electrode tip 502 is an annual member 700 around which the electrical conductor 604 is wound. The electrode tips 502, 504 of the vertical soft electrode assembly 500 provide structural support and, together with the electrical conductors 604, 606, a structure for transferring an electrical correction stimulus to the animal.

Figure 8:
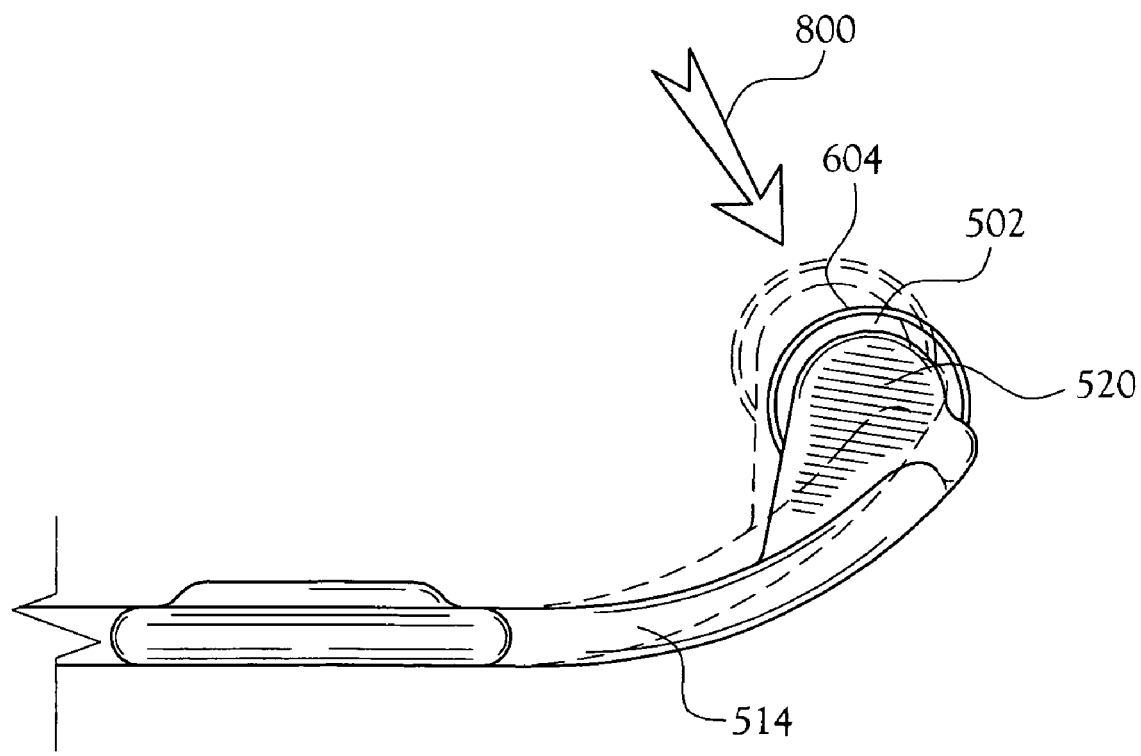
FIG. 8 illustrates one end of the electrode assembly of FIG. 5 showing the movement of the probe member in response to an applied force resulting from over-tightening of the collar.

FIG. 8 illustrates the effects of a force 800 applied to one of the projections 520 of the vertical soft electrode assembly 500. The resting position of the projection 520 is shown in phantom relative to the new position of the projection 520 due to the applied force 800. Because of the flexibility of the materials used in the projections 520, 522 and the electrical conductors 604, 606, the projections 518, 520 are able to move in response to the force 800 without breaking. The projections 518, 520 is sufficiently flexible to move in response to the applied force 800 to reduce the pressure applied to the throat of the animal by the vertical soft electrode assembly 500. Repositioning the projections 520, 522 of the vertical soft electrode assembly 500 in response to an applied force alleviates pain, discomfort, and potential injury to the animal, including conditions such as pressure necrosis. For the illustrated embodiment of the vertical soft electrode assembly 500, the entirety of each projection 520, 522 generally define a flexible zone.

Figure 9:
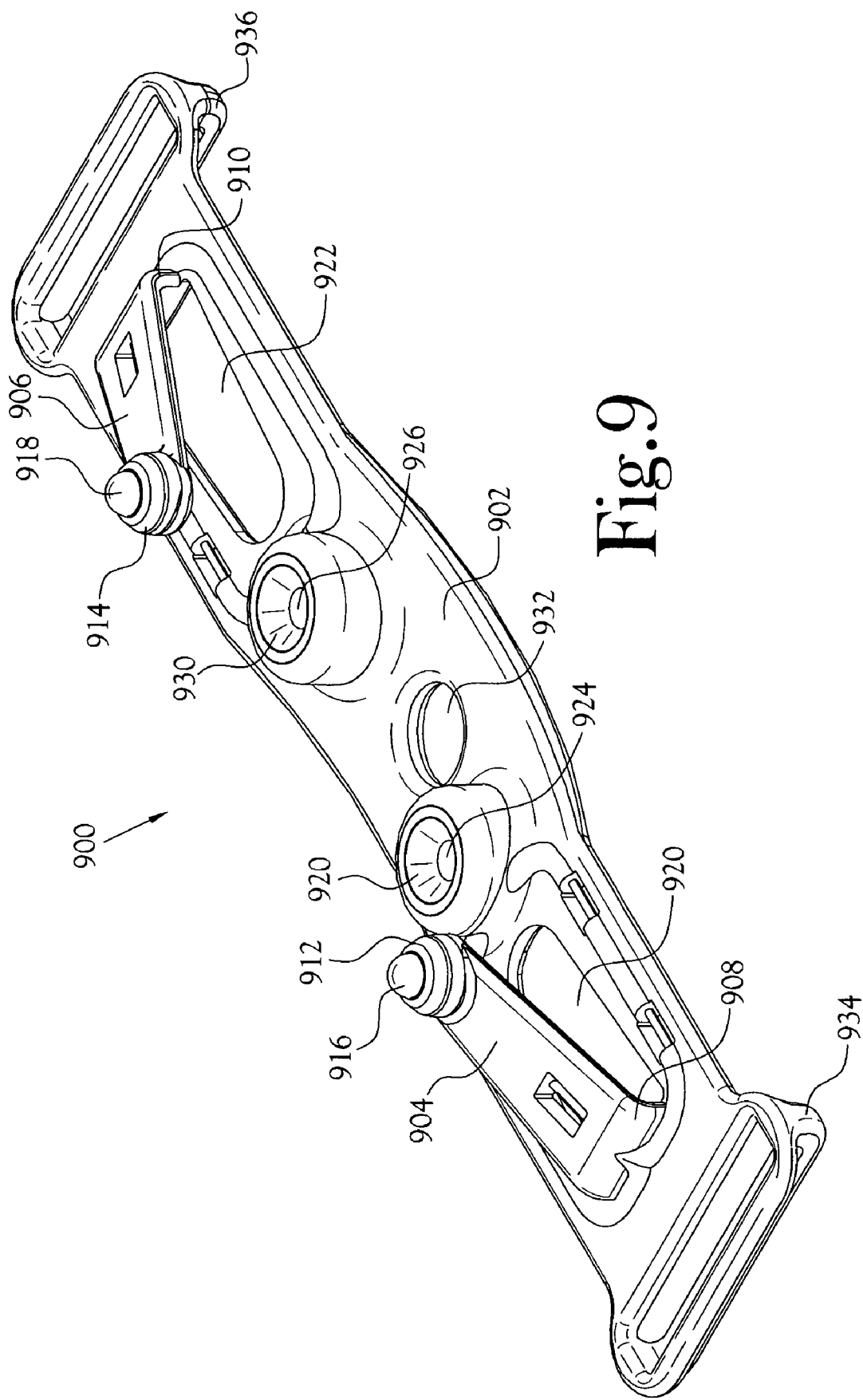
FIG. 9 is a perspective view of another embodiment of an electrode assembly having a mechanical pre-load.

FIG. 9 is a perspective view of a mechanical pre-load electrode assembly 900. The mechanical pre-load electrode assembly 900 includes a substantially rigid base 902. A first projection 904 and a second projection 906 are located proximate to opposing ends of the base 902 and extend outwardly from the base 902 to form a pair of probes. In the illustrated embodiment, the first projection 904 and the second projection 906 are substantially rigid members that are attached to the base 902 at a first end 908, 910 and move freely at a distal second end 912, 914. The configuration of the connection between the base 902 and each first end 908, 910 results in a flexible joint that allows the second end 912, 914 to move towards and away from the base 902. An electrode tip 916, 918 is carried proximate to the second end of each of the first projection 904 and the second projection 906. The electrode tips 916, 918 are fabricated from an electrically conductive material and serve to transfer the corrective stimulus to the animal. The base defines a pair of through-openings 920, 922 beneath the projections 904, 906 that allow the projections 904, 906 to be lowered to a point where the electrode tips 916, 918 do not substantially extend beyond the height of the base 902.

The mechanical pre-load electrode assembly 900 also includes a pair of connector openings 924, 926 adapted to receive a fastener that secures the mechanical pre-load electrode assembly 900 to the collar unit. A grommet 928, 930 bounding each of the connector openings 924, 926 provide electrical and physical connection points. In the illustrated embodiment, the mechanical pre-load electrode assembly 900 includes a probe opening 932 to accommodate collar units such as anti-bark collars that include a probe resting against the neck of the animal to detect vibrations. Finally, the illustrated embodiment shows a pair of collar guides 934, 936 that are adapted to receive a collar and secure the collar unit and the mechanical pre-load electrode assembly 900 to the animal.

Figure 10:
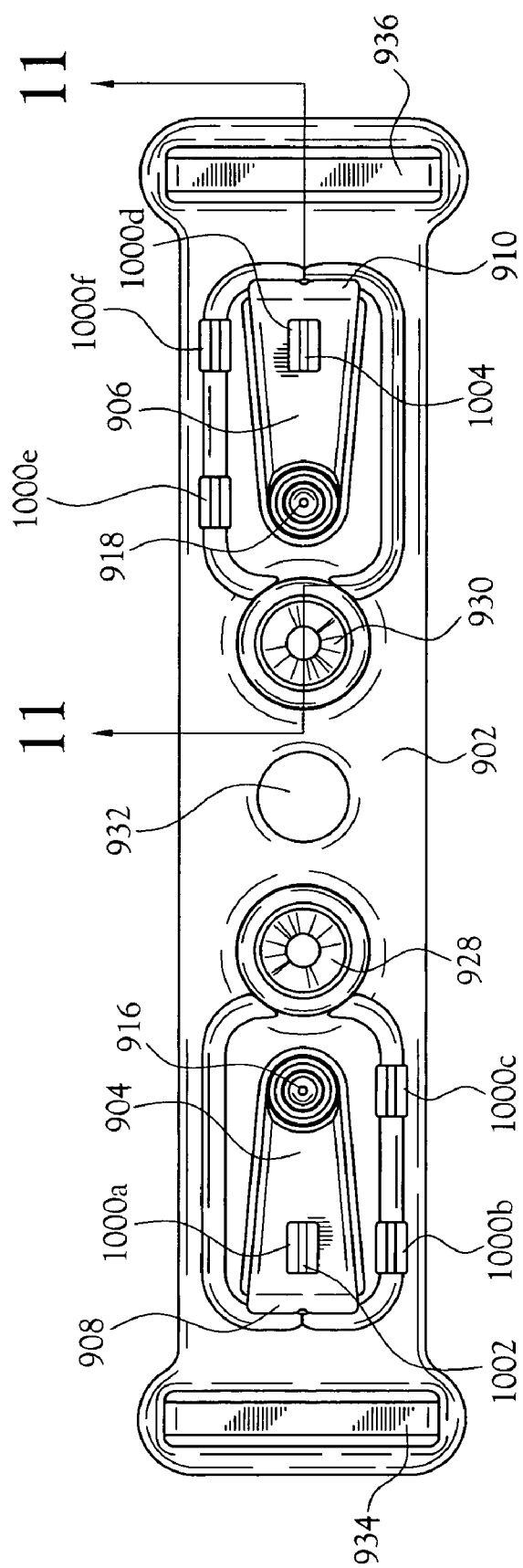
FIG. 10 is a top plan view of the electrode assembly of FIG. 9.
Figure 11:
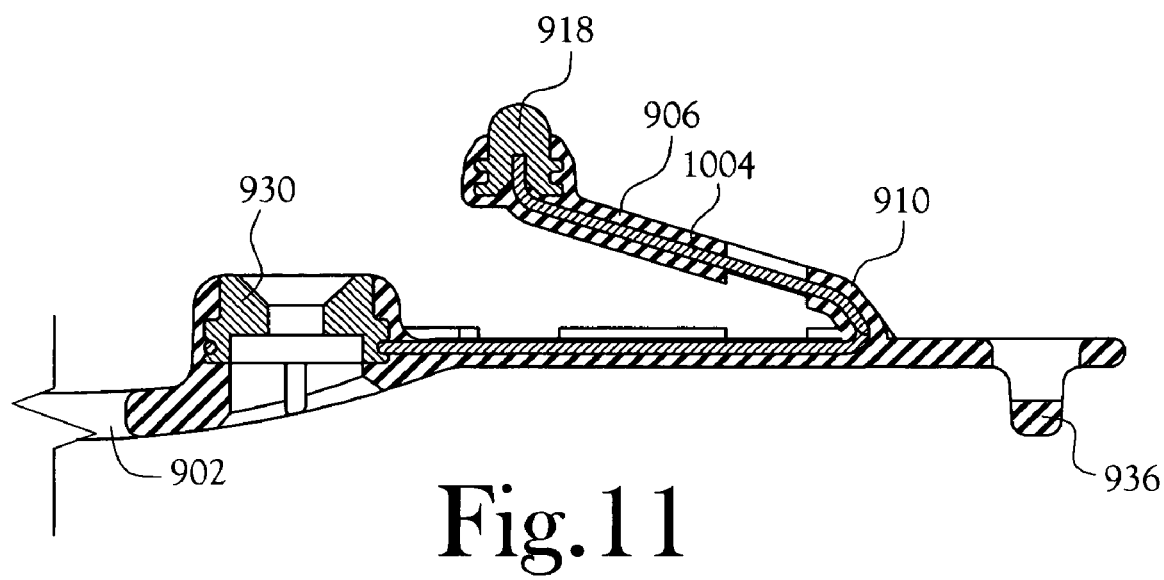
FIG. 11 is a sectional view of the electrode assembly of FIG. 9 taken along section lines 12-12.

FIG. 10 is a top plan view of the mechanical pre-load electrode assembly 900. In the illustrated embodiment, at least one opening 1000a-f exposes portions of the electrical conductors 1002, 1004 connecting each of the grommets 928, 930 to the corresponding electrode tip 916, 918. FIG. 11 is a sectional view of FIG. 10 taken along lines 11-11 providing a view of the internal structure of an end portion of the mechanical pre-load electrode assembly 900. The internal structure uses similar components to those found in the horizontal soft electrode assembly 100.

Figure 12:
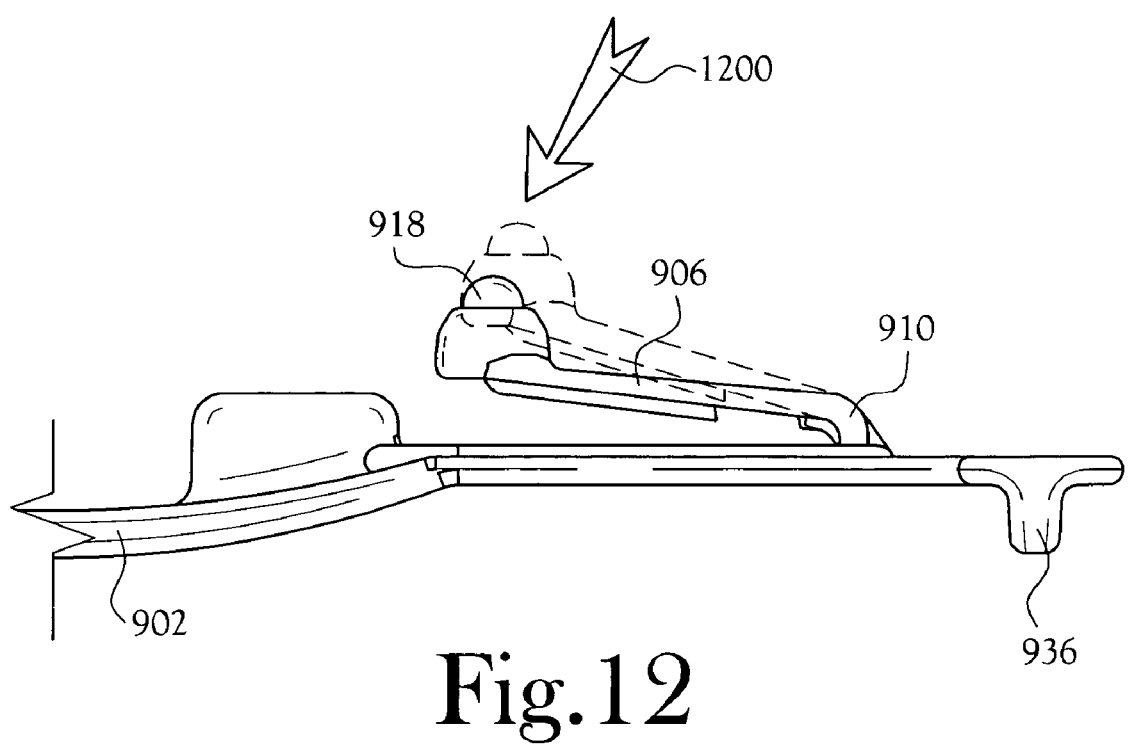
FIG. 12 illustrates one end of the electrode assembly of FIG. 9 showing the movement of the probe member in response to an applied force resulting from over-tightening of the collar.

FIG. 12 illustrates the effects of a force 1200 applied to one of the projections 906 of the mechanical pre-load electrode assembly 900. The resting position of the projection 906 is shown in phantom relative to the new position of the projection 906 due to the applied force 1200. Because of the mechanical design of the projections 904, 906 and the flexibility of the materials used in the projections 904, 906 and the electrical conductors 1002, 1004, the projections 904, 906 are able to move in response to the force 1200 without breaking. The projections 904, 906 are sufficiently flexible to move in response to the applied force 800 to reduce the pressure applied to the throat of the animal by the mechanical pre-load electrode assembly 900. Repositioning the projections 904, 906 of the mechanical pre-load electrode assembly 900 in response to an applied force alleviates pain, discomfort, and potential injury to the animal, including conditions such as pressure necrosis.

Figure 13:
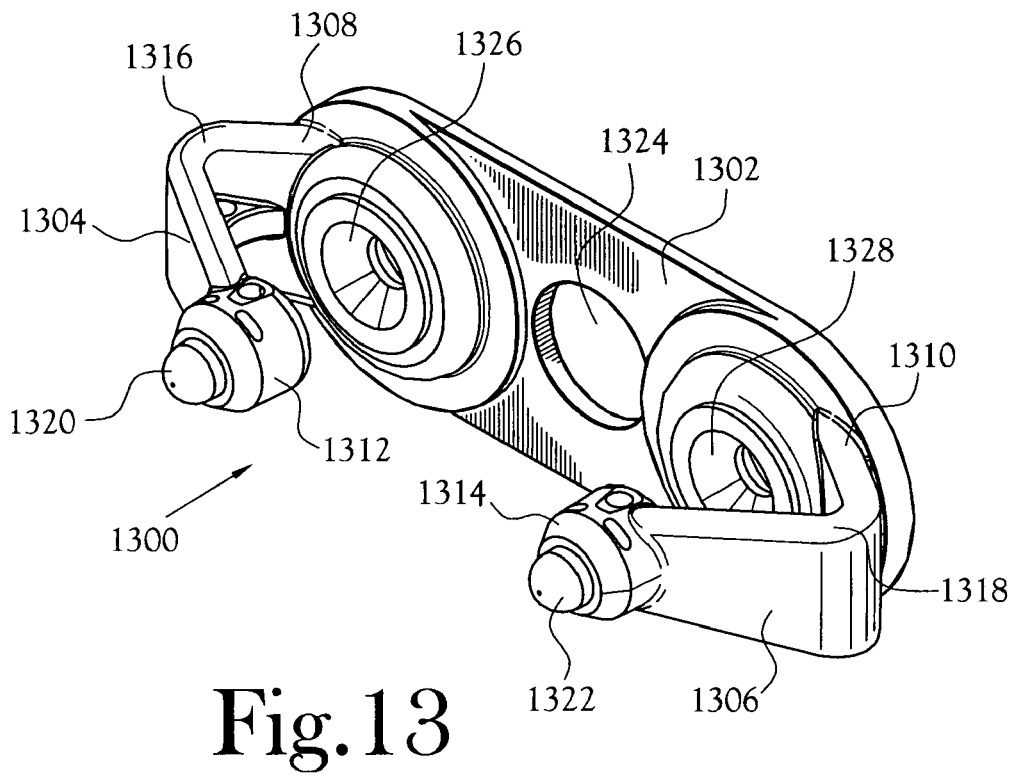
FIG. 13 is a perspective view of another embodiment of an electrode assembly having a mechanical pre-load.

FIG. 13 is a perspective view of an alternate embodiment of a mechanical pre-load electrode assembly 1300. The compact mechanical pre-load electrode assembly 1300 eliminates the extensions that provide the collar guides 934, 936 shown in FIGS. 9-12. The compact mechanical pre-load electrode assembly 1300 includes a substantially rigid base 1302. A first projection 1304 and a second projection 1306 are located proximate to opposing ends of the base 1302 and extend outwardly from the base 1302 to form a pair of probes. In the illustrated embodiment, the first projection 1304 and the second projection 1306 are substantially rigid members that are attached to the base 1302 at a first end 1308, 1310 and move freely at a distal second end 1312, 1314. A bend 1316, 1318 in the projections 1304, 1306 between the first ends 1308, 1310 and the second ends 1312, 1314 results in a flexible joint that allows the second ends 1312, 1314 to move towards and away from the base 1302. An electrode tip 1320, 1322 is carried proximate to the second end 1312, 1314 of each of the first projection 1304 and the second projection 1306. The electrode tips 1316, 1318 are fabricated from an electrically conductive material and serve to transfer the corrective stimulus to the animal. Also visible is the optional probe opening 324 to accommodate collar units such as anti-bark collars that include a probe resting against the neck of the animal to detect vibrations. Further, the compact mechanical pre-load electrode assembly 1300 includes a pair of grommets 1326, 1328, each surrounding one of a pair of connector openings adapted to receive a fastener that secures the compact mechanical pre-load electrode assembly 1300 to the collar unit. The grommets 1326, 1328 provide electrical and physical connection points.

Figure 14:
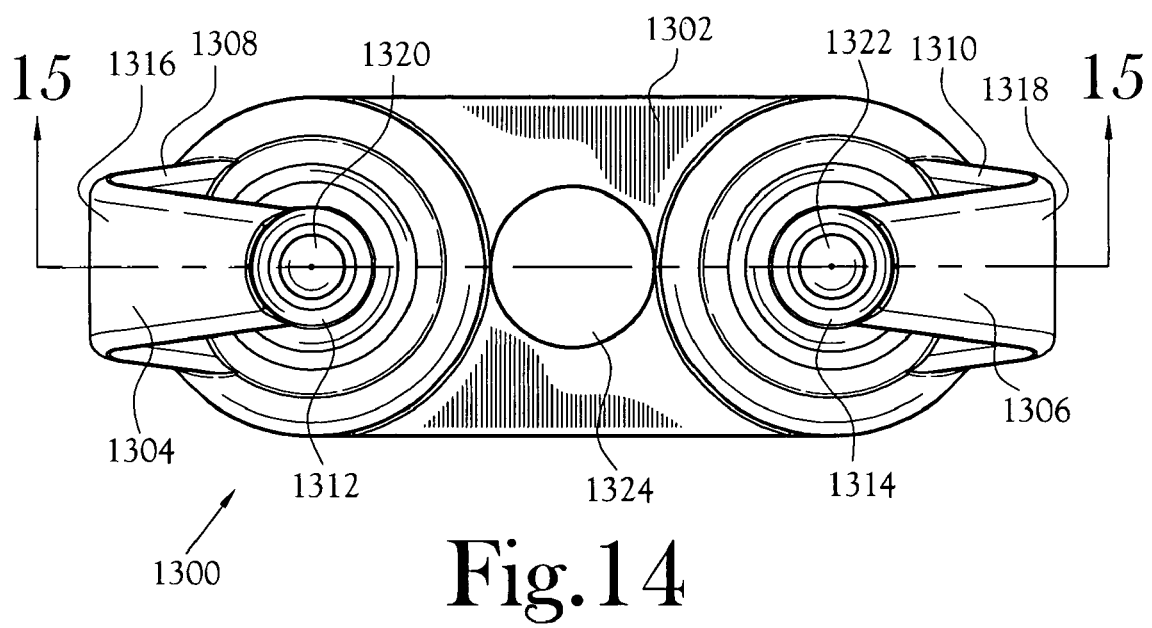
FIG. 14 is a front elevation view of the electrode assembly of FIG. 13.
Figure 15:
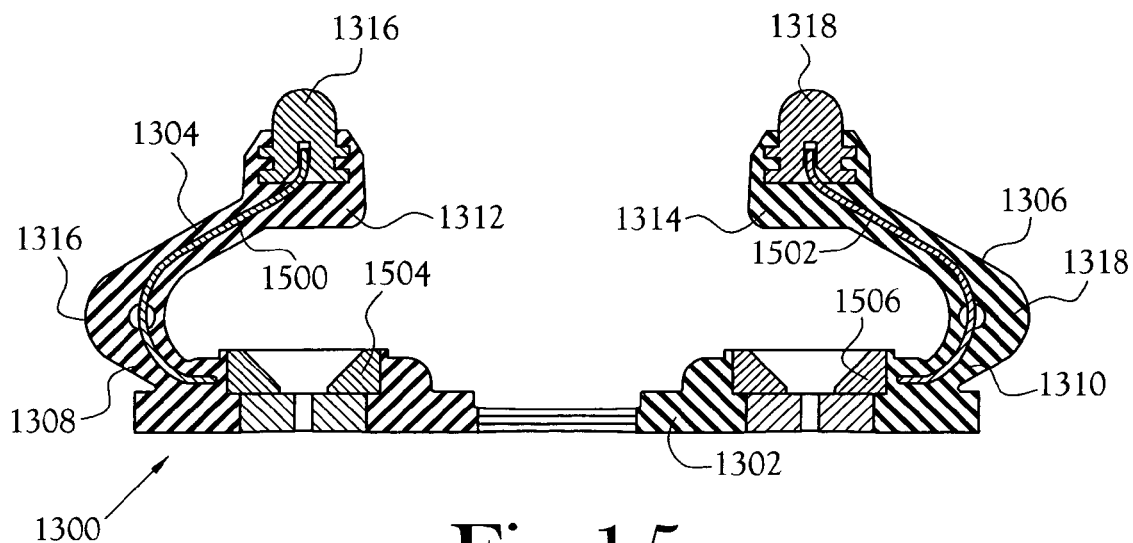
FIG. 15 is a sectional view of the electrode assembly of FIG. 13 taken along section lines 16-16.

FIG. 14 is a front elevation view of the compact mechanical pre-load electrode assembly 1300. FIG. 15 is a sectional view of FIG. 14 taken along lines 15-15 providing a view of the internal structure of the compact mechanical pre-load electrode assembly 1300. Visible are the conductors 1500, 1502 that connect the electrode tips 1316, 1318 to the corresponding grommets 1326, 1328. In the illustrated embodiment of the compact mechanical pre-load electrode assembly 1400, the electrode tips 1316, 1318 are closer together than those shown in other embodiments with the electrode tips 1316, 1318 located substantially above the grommets 1326, 1328.

Figure 16:
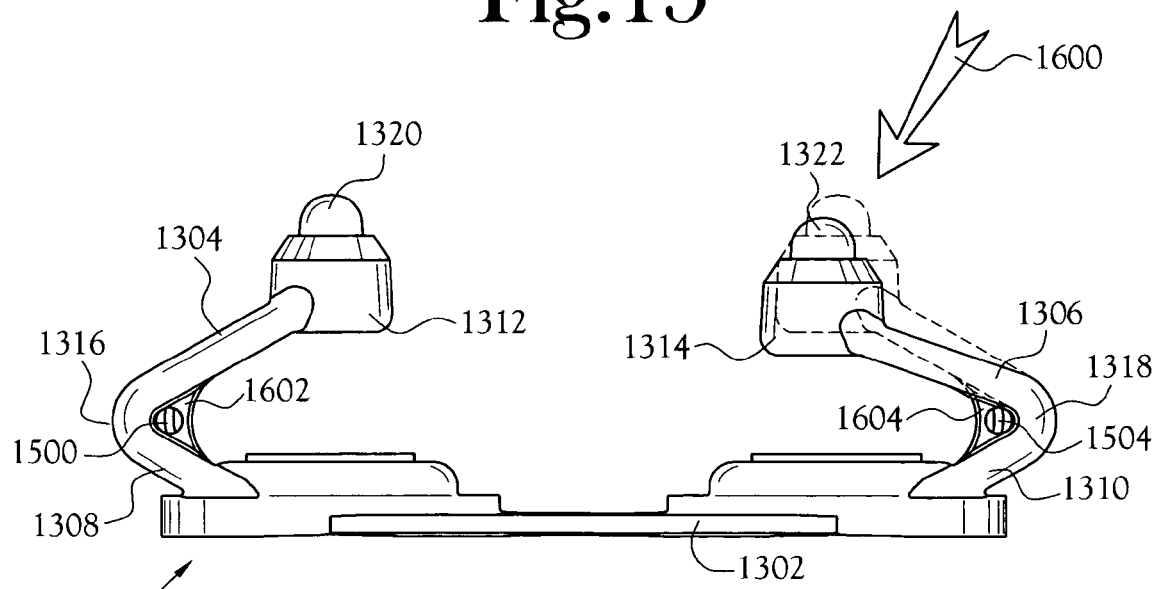
FIG. 16 illustrates one end of the electrode assembly of FIG. 13 showing the movement of the probe member in response to an applied force resulting from over-tightening of the collar.

FIG. 16 illustrates the effects of a force 1600 applied to one of the projections 1306 of the compact mechanical pre-load electrode assembly 1300. The resting position of the projection 1306 is shown in phantom relative to the new position of the projection 1306 due to the applied force 1600. As previously mentioned, the projections 1304, 1306 have a flexible zone in the area proximate to the bends 1316, 1318. Located in the inner curve of each bend 1316, 1318 is a support member 1602, 1604. The support members 1602, 1604 serve various functions including strengthening the flexible zone to prevent the projections 1304, 1306 from breaking proximate to the bends 1316, 1318, adjusting the amount of force required to bend the projections 1304, 1306, and to return the projections 1304, 1306 to default positions. Although, typically molded from the same material as the compact mechanical pre-load electrode assembly 1300, in some embodiments the support members 1602, 1604 are fabricated using a material having different flexibility and resilience characteristics. Accordingly, the support members 1602, 1604 may be substantially rigid or substantially flexible as desired. Further, in some embodiments, the support members are fabricated using springs.

Because of the mechanical design of the projections 1304, 1306 and the flexibility of the materials used in the projections 1304, 1306, the support members 1602, 1604, and the electrical conductors 1500, 1502, the projections 1304, 1306 are able to move in response to the force 1600 without breaking. The projections 1304, 1306 are sufficiently flexible to move in response to the applied force 1600 to reduce the pressure applied to the throat of the animal by the mechanical pre-load electrode assembly 1300. Repositioning the projections 1304, 1306 of the mechanical pre-load electrode assembly 1300 in response to an applied force alleviates pain, discomfort, and potential injury to the animal, including conditions such as pressure necrosis.

In an alternate embodiment, the flexible zone around the bends 1316, 1318 is accomplished by hingeably connecting two independent elongated members and regulating the resting position and movement using, for example, a spring as the structural member.

Figure 17:
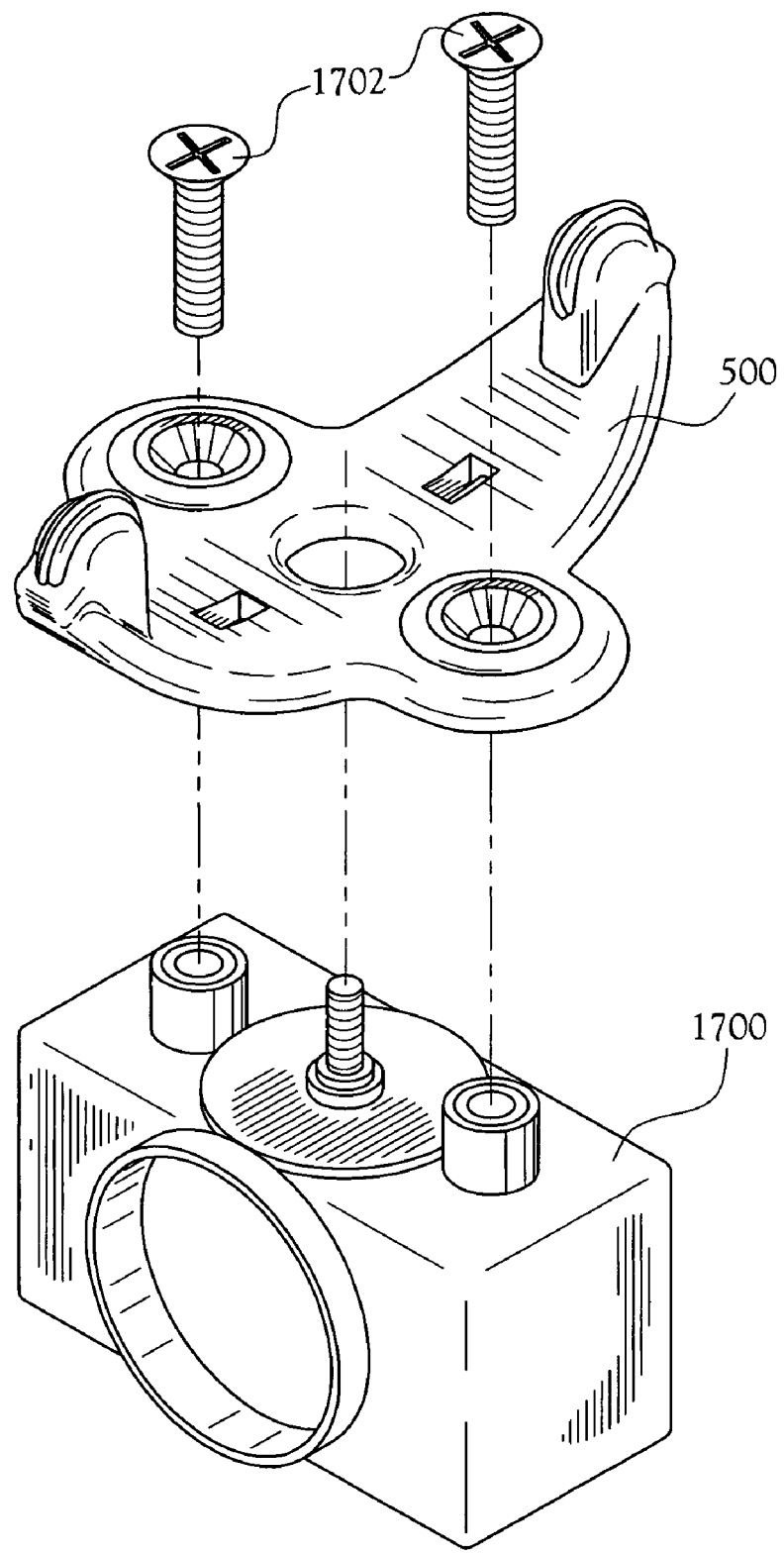
FIG. 17 is an exploded assembly drawing of an electronic animal training apparatus using the electrode assembly of the present invention.

FIG. 17 is an exploded assembly drawing showing the vertical soft electrode assembly 500 of FIG. 5 with a typical electronic animal training apparatus collar unit 1700. The vertical soft electrode assembly 500 is attached to the collar unit 1700 by electrically conductive fasteners 1702, illustrated as screws.

Proper fit and placement of an electronic animal training apparatus is necessary for achieving the effective operation. A typical mechanism for securing an electronic animal training apparatus to a pet is with a collar, although other mechanisms are considered to be with the scope and spirit of the present invention. With conventional rigid electrodes a typical set of fitting instructions notify the consumer that the electrodes must be placed in direct contact to the animal's skin on the underside of the animal's neck with the animal in a standing position. Further, it is suggested that sometimes it is necessary to trim the fur in the area where the electrodes engage the animal's skin to ensure consistent contact. The tightness of the collar when using rigid electrodes is tested by inserting one finger between the end of the electrode and the animal's neck. The fit should be snug but not constricting.

The general instructions for fitting an electronic animal training apparatus to an animal are subjective and depend upon variables such as the thickness of the consumer's fingers and the consumer's definitions of "snug" and "not constricting." As previously discussed, the interpretation of "snug but not constricting" is modified by the consumer's concerns over effective operation and potential pain, discomfort, and injury. The animal training electrode assembly of the present invention, as illustrated and described through various embodiments, reduces the effects of the subjective variables and allows the associated electronic animal training apparatus to operate more effectively regardless of the consumer's predispositions affecting collar tightness.

A flexible animal training electrode assembly has been shown and described. The flexible animal training electrode has a flexible zone associated that allows an associated electrode tip to be displaced in response to an applied force. The ability to displace the electrodes results from the use of flexible and resilient materials in the construction of a soft electrode assembly or mechanical design features that allow a projection fabricated from a substantially rigid material to flex in the construction of a mechanical pre-load electrode assembly. Repositioning the projections of the flexible electrode assembly in response to an applied force alleviates pain, discomfort, and potential injury to the animal, including conditions such as pressure necrosis.

Through the various embodiments, numerous features and variations applicable to the electrode assembly have been shown. Other embodiments of the electrode assembly may incorporate or delete some or all of these features as necessary or desired without departing from the scope and spirit of the present invention. Some embodiments may optionally include an input opening for accommodating an input probe such as the vibration sensor of a bark collar. The distance between the electrode tips can vary in differing embodiments as desired to accommodate a particular animal size category or as necessary to accommodate the physical size of the electrode assembly. Other embodiments may optionally include collar guides to route a collar and provide a mechanism for securing the entire collar unit to the animal. Relief openings in the base of some embodiments may be used to vary the amount of force necessary to displace the electrode tips. Other embodiments may use openings that provide a greater range of movement such as allowing the projections to be displaced below the surface level of the base. The electrode assembly may also include exposure openings allowing visual inspection of the electrical conductors or other access to the conductors such as connection points for continuity testing. In embodiments using substantially rigid projections, the flexible zone may include a reinforcement member. The reinforcement member serves at one of several functions such as preventing the flexible zone from being stressed to a breaking point, providing a counter-force to maintain a desired tension on the projection, or returning the projection to specified resting position when the projection is not subject to an applied force.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An electrode assembly for use with an electronic animal training apparatus, said electrode assembly comprising:
    a base having a first connection point and a second connection point, said first connection point and said second connection point allowing said base to be electrically connected to the electrical animal training apparatus;
    a first projection extending from said base and having at least a portion moveable relative to said base, said first projection being fabricated from an electrically non-conductive material;
    a first electrode in electrical communication with said first connection point, said first electrode supported by said first projection whereby said first electrode is displaceable relative to said base;
    a second projection extending from said base and having at least a portion moveable relative to said base, said second projection being fabricated from an electrically non-conductive material; and
    a second electrode in electrical communication with said second connection point, said second electrode supported by said second projection whereby said second electrode is displaceable relative to said base.

* * * * *